United States Patent Office 3,661,810
Patented May 9, 1972

---

3,661,810
NONCLUMPING THERMOPLASTIC PARTICLES AND PROCESS OF MAKING SAME
Herbert Gahmig, Princeton, N.J., assignor to BASF Wyandotte Corporation, Wyandotte, Mich.
No Drawing. Filed June 17, 1970, Ser. No. 47,176
Int. Cl. C08j 1/26, 1/30
U.S. Cl. 260—2.5 B                                           8 Claims

---

ABSTRACT OF THE DISCLOSURE

Clumping of thermoplastic particles is prevented by mixing the particles with finely divided hydrophobic silica powder. The mixture retains its free-flowing characteristics during storage.

---

BACKGROUND OF THE INVENTION

(1) Field of invention

The present invention is directed to a free-flowing mixture of thermoplastic particles and hydrophobic silica powder, and to a method of treating thermoplastic particles and, in particular, expandable polystyrene particles to prevent clumping during storage and during the pre-expansion, and improving the general characteristics of the material during their processing to finished articles.

(2) Description of prior art

It has been found that thermoplastic particles, and in particular, expandable polystyrene or styrene copolymer particles tend to agglomerate or clump during storage. As is pointed out, for example, in U.S. Patent 2,787,809, beads or particles of thermoplastic materials which have been partly foamed but which still contain an expanding agent, can be heated in a closed mold to produce shaped articles. These incompletely expanded polymer particles are particularly susceptible to clumping (agglomeration) under storage conditions. Such particles are also especially subject to clumping and moisture absorption during the prefoaming step in the widely used steam pre-expander. The tendency to clump and become moist increases as the size of the beads decreases. The use of particles that have agglomerated due to moisture or partial fusion to make articles present numerous problems. Imperfect cellular molded articles often result where such particles are used.

Numerous methods have been tried in an attempt to eliminate clumping and moisture absorption and to enhance the flow characteristics, partciularly of expanded polystyrene beads. As an example, the raw beads are frequently coated with various substances such as silicon oils, zinc stearate and the like. While the known coating methods are helpful, they have not proved to be fully satisfactory. Particles that are treated in this manner still tend to agglomerate to some appreciable degree, especially during prefoaming and, therefore, have to be screened off and frequently must be discarded. Furthermore, the use of such prior art methods often have an adverse effect on certain properties of shaped articles produced from thermoplastic particles.

It is an object of the present invention to provide a method of treating thermoplastic particles or beads to improve their properties and to enhance the free-flowing characteristics of the beads.

Another object of the invention is to provide expandable or pre-expanded thermoplastic particles which can be stored for extended periods of time while still maintaining the free-flowing characteristics of the mixture.

Other objects will become apparent to those skilled in the art from the following description of the invention.

BRIEF SUMMARY OF INVENTION

In general, the subject invention comprises the discovery that agglomeration, excessive moisture adsorption, etc., of thermoplastic particles can be prevented by mixing said particles with finely divided hydrophobic silica powder. The powder maintains not only the free-flowing characteristics of the expanded or expandable thermoplastic particles, but also enhances significantly the range under which pre-expandable thermoplastic beads, in particular polystyrene, can be expanded in the commonly used steam pre-expander. It facilitates further the rapid drying of beads thus pre-expanded and improves the free-flowing characteristics of such materials. Furthermore, the powder does not in any way adversely affect the properties of molded articles, such as the self-extinguishing characteristics, etc., produced from said particles.

DETAILED DESCRIPTION OF INVENTION

The thermoplastic particles that can be treated by the subject method include expandable or pre-expanded polystyrene or styrene copolymer particles as well as other thermoplastic particles. As an example, the invention is useful in treating any of the polymeric particles or beads disclosed in U.S. Patent 2,787,809, which patent is incorporated herein by reference. By thermoplastic it is meant to include in addition to the polymers specifically enumerated elsewhere in this application the thermoplastic polymers as stated in the foregoing patent at column 1, lines 58 through 63, namely, polystyrene, polyvinyl chloride, polyvinylidene chloride, polyacrylic esters, polymethacrylic esters, polyacrylonitrile and interpolymers of butadiene or other dienes and styrene or acrylonitrile. The process can also be used in connection with expanded polyethylene particles. Specifically, the invention can be used whereever clumping, agglomeration or moisture presents a problem in connection with the handling or use of thermoplastic polymer particles.

The hydrophobic silica particles that are used in the subject method can be prepared by a variety of processes. In particular, any one of several well known forms of silica can be treated to convert the normally hydrophilic silica to hydrophobic silica. These silica forms include precipitated silica, fume sliica, and silica aerogel. Precipitated silica is prepared by adjusting the pH of an aqueous solution of sodium silicate to a pH of from about 8 to 10 and precipitating the silica by reacting the sodium silicate with a dilute inorganic acid while maintaining the same pH range. Fume silica is a colloidal silica which is obtained by burning silicon tetrachloride and by collecting the resulting silica smoke. Silica aerogel is a colloidal silica which is prepared by displacing water from a silica hydrogel with a low boiling, water-miscible organic liquid, and by heating the material above its critical temperature followed by venting.

Several methods are known by which silica particles of the above type can be made hydrophobic. Any method may be employed for this purpose. In one such method, a polysiloxane oil is sprayed onto the silica particles. After the spraying operation, the particles are heated for at least one-half hour at temperatures of above 150° C. Ordinarily, the heating temperature is not higher than about 350° C. because the temperatures above this level cause a degradation of many of the lower boiling polysiloxane oils. The heating can be continued for 20 hours or more.

A wide variety of polysiloxane oils can be used to convert the silica from a hydrophilic state to a hydrophobic state. These oils include any alkyl, aryl, alicyclic or aralkyl siloxane or polysiloxane having a viscosity of from about 10 centistokes, to about 3,000 centistokes at 25° C. Among the most common polysiloxanes which can be used in producing the subject silica particles are dimethyl polysiloxane, diethyl polysiloxane, dipropyl polysiloxane, methyl ethyl polysiloxane, dioctyl polysiloxane, dihexyl polysiloxane, methylpropyl polysiloxane, dibutyl polysiloxane, didodecyl polysiloxane etc. The amount of silicone oil may vary widely. It has been found that from about 0.5 to about 100% by weight based on the weight of the silica will be satisfactory in most instances.

The silica particles can also be rendered hydrophobic by treatment with organo-silicon halides or mixtures of organo-silicon halides. Examples of suitable organo-silicon halides are set out in U.S. Pats. 2,306,222 and 2,412,470. Alkyl, aryl, alicyclic, and/or aralkyl silicon halides can be used for this purpose. The silica particles are treated with the organo-silicon halide by agitating the finely divided particles in a closed container in the presence of vapors of the organo-silicon halide so that the vapors are absorbed on the relatively hydrophilic silica. The amount of organo-silicon halide and the length of treatment will vary depending upon the surface area of the silica and the nature of the organo-silicon halide that is used for this purpose. It has been suggested that from about 0.5 to 50% by weight based on the weight of the silica particles of the organo-silicon halide be used and that a treatment time of at least one-half hour be employed. It is preferred to use from about 0.5% to 20% by weight based on the weight of the organo-silicon halide and a treating time of from about one-half hour to about two hours.

In a preferred embodiment of the invention a precipitated silicon particle which has been rendered hydrophobic by any suitable means is employed in the process. A suitable product of this type is sold, for example, under the trade designation QUSO WR 82 by the Philadelphia Quartz Company. This material has a particle size of from about 0.013 to about 0.019 micron, a pH of from about 10.5 to about 13, and a surface area of from about 90 to about 150 meters square per gram. Other hydrophobic silica types of the said company, such as QUSO WR 51, will also serve the same purpose.

It is necessary that the hydrophobic silica particles be finely divided. While particles having a diameter of from about 2 to 50 millimicrons are useful for most purposes, it is preferred that the particles have a diameter of 20 millimicrons or less. Particles having a size range of from 2 to 20 millimicrons and especially from 10 to 20 millimicrons have been found to be particularly effective. A large proportion of the particles (more than half) will ordinarily be substantially spherical in shape.

The amount of hydrophobic silica particles that is mixed with the thermoplastic particles can vary over a wide range. The addition of small amounts of the hydrophobic silica notably reduces the tendency of the particles to clump and also produces dry pre-expanded beads. A mixture containing as little as 0.005% of hydrophobic silica has a marked effect on the properties of the thermoplastic particles. From 0.002% to 0.2% by weight of hydrophobic silica particles based on the weight of the thermoplastic particles will be useful for most purposes. The preferred weight range would be from about 0.01 to about 0.1% of hydrophobic silica based on the weight and size of the thermoplastic particles.

EXAMPLE

The present example serves to illustrate the subject invention. The following materials were added to expandable polystyrene beads having a particle size of 0.3–2.0 mm. diameter: 0.03% QUSO WR 82 (precipitated hydrophobic silica particles having a particle diameter of 0.013 to 0.019 micron, and a surface area of from about 90 to 150 square meters per gram) 0.03% stearic acid powder alone or with 0.03% zinc stearate.

The above mixture was combined with the expandable polystyrene beads in a blender and mixed for 5 minutes. It was found that on extended storage over several months this mixture did not clump or change its characteristics. The beads showed very favorable pre-expanding characteristics, practically did not clump at all under a wide variety of steaming and feeding conditions, and were remarkably dry immediately after pre-expansion. They had excellent flow- and mold-filling characteristics. Fusion of the beads to form a desired product by the closed-mold process was not adversely affected by the presence of the hydrophobic silica particles. While liquid silicon compounds applied directly to the surface of expandable polystyrene beads readily destroy the self-extinguishing properties of that type of polystyrene, the addition of hydrophobic silica as described in this invention in no way alters the flame resistance of such material. Concentrations from 0.03 to 0.1%, for example, were found to have no effect up the self-extinguishing characteristics of such type of polystyrene.

In the above formulation, zinc stearate was added to enhance the release of the formed articles from the molds, while stearic acid was added to give the articles a better surface appearance.

It is believed that ultrafine particles of the hydrophobic silica serve as "distance holders," preventing the contact of the individual beads especially during the pre-expanding operation and, therefore, virtually eliminate all clumping. The particles appear to have a "ball bearing" effect which enhances the free-flowing properties of the beads. Unlike zinc stearate and other materials, the hydrophobic silica particles do not seem to impair the fusion characteristics of the beads. Furthermore, the mixture can be easily metered with existing equipment which, therefore, makes it possible to carry out without difficulty a continuous production process. The short mixing cycle (in a Loedige mixer or the like) increases further the production capacity of the coating system. The invention prevents also the loss of the expanding agent (pentane) due to the absence of existing mechanical forces, which damage the surface of the thermoplastic beads. Product quality is also improved because of the complete absence of heat necessary in the blending process.

Obviously many modifications and variations of the invention as hereinbefore set forth may be made without departing from the spirit and scope thereof, and therefore only such limitations should be imposed as are indicated in the appended claims.

I claim:
1. A composition which comprises particles of an expandable thermoplastic polymer wherein said polymer is selected from the group consisting of polystyrene, polyvinyl chloride, polyvinylidene chloride, polyacrylic esters, polymethacrylic esters, polyacrylonitrile, interpolymers of butadiene or other dienes and styrene or acrylonitrile and polyethylene, coated with finely divided hydrophobic silica having an average particle diameter of 2 to 50 millimicrons, the amount of said finely divided hydrophobic silica being from 0.002% to 0.2% by weight based on the weight of said thermoplastic polymer particles.

2. A composition as in claim 1, wherein said thermoplastic particles are expandable particles of a styrene polymer or copolymer.

3. A composition as in claim 2, wherein said hydrophobic finely divided silica has an average particle diameter of from about 10 to 20 millimicrons.

4. A composition as in claim 3, wherein the amount by weight of finely divided silica based on the weight of the thermoplastic particles is from about 0.01% to about 0.1%.

5. A process for treating expandable thermoplastic polymer particles, said polymer being selected from the group consisting of polystyrene, polyvinyl chloride, polyvinylidene chloride, polyacrylic esters, polymethacrylic esters, polyacrylonitrile, interpolymers of butadiene or other dienes and styrene or acrylonitrile and polyethylene to inhibit the tendency of said particles to form clumps and improve their flowing characteristics during storage and processing which comprises: adding to said particles from 0.002% to 0.2% by weight based on the weight of said polymer particles of finely divided hydrophobic silica having an average particle diameter of from about 2 to 50 millimicrons, and mixing said hydrophobic silica and said thermoplastic polymer particles to form a free-flowing composition.

6. A process as in claim 5, wherein said thermoplastic particles are expandable particles of a styrene polymer or copolymer.

7. A process as in claim 6, wherein said finely divided hydrophobic silica has an average particle diameter of from about 10 to 20 millimicrons.

8. A process as in claim 7, wherein the amount by weight of finely divided hydrophobic silica based on the weight of the thermoplastic particles is from about 0.01% to about 0.1%.

References Cited

UNITED STATES PATENTS

| | | | |
|---|---|---|---|
| 3,304,274 | 2/1967 | Eng | 260—2.5 B |
| 3,444,104 | 5/1969 | Immel | 260—2.5 B |
| 2,733,160 | 1/1956 | Iler | 117—5.1 |

MURRAY TILLMAN, Primary Examiner

M. FOELAK, Assistant Examiner

U.S. Cl. X.R.

117—100 C; 260—41 A